May 21, 1957  F. C. ALBRIGHT  2,793,047
STABILIZING AND CENTERING MEANS FOR DIRIGIBLE VEHICLE RUNNING GEAR
Filed March 15, 1951  4 Sheets-Sheet 1
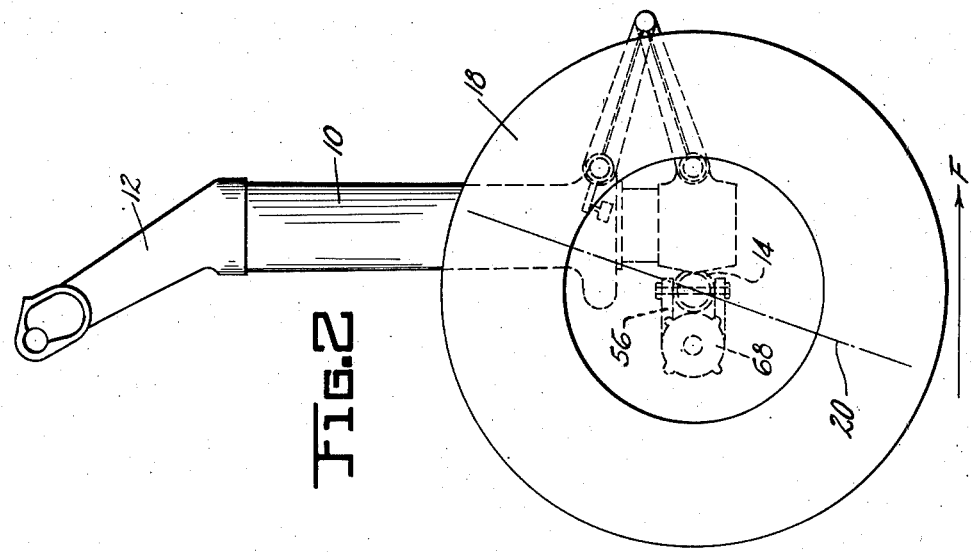
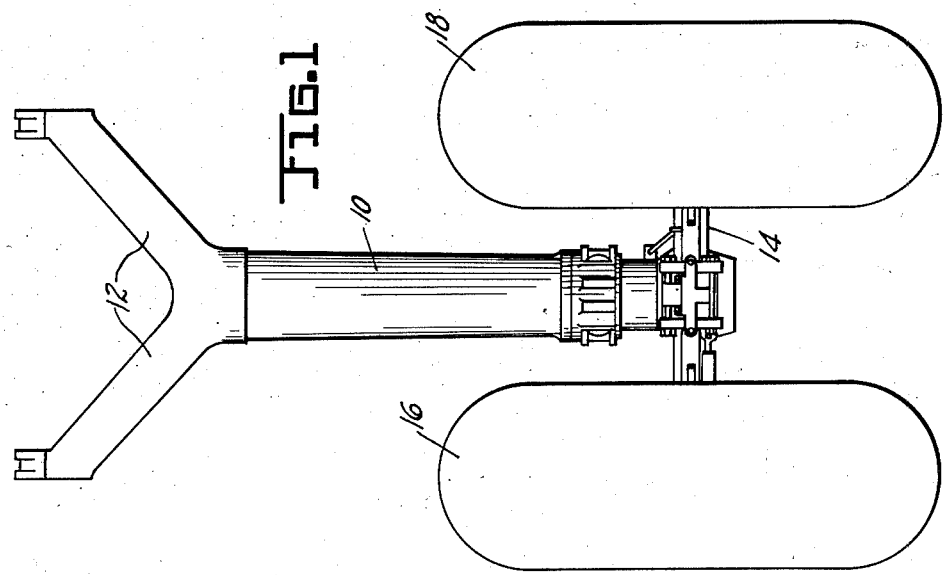
INVENTOR.
FRANKLIN C. ALBRIGHT
BY
ATTORNEY

INVENTOR.
FRANKLIN C. ALBRIGHT
BY
ATTORNEY

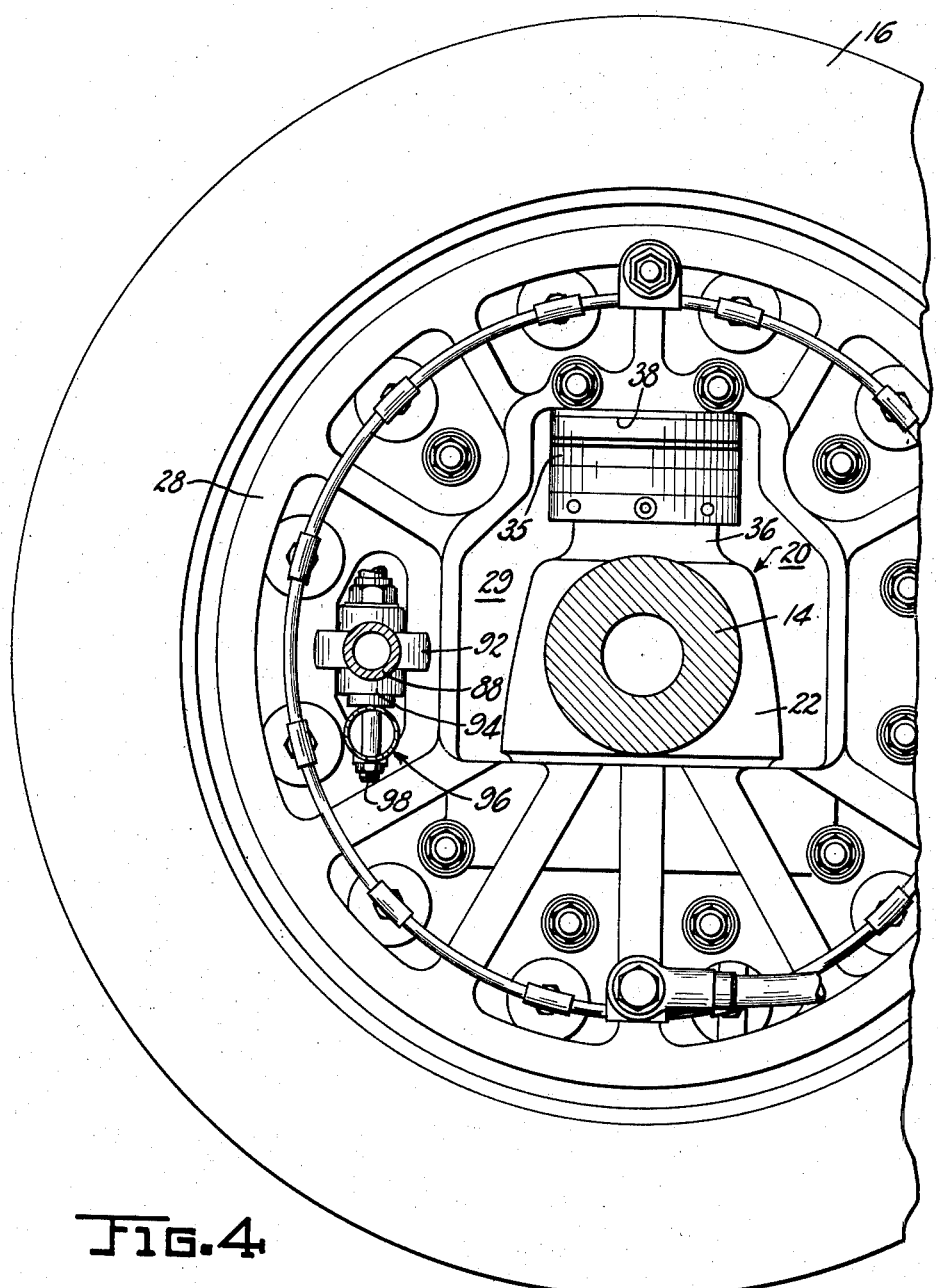

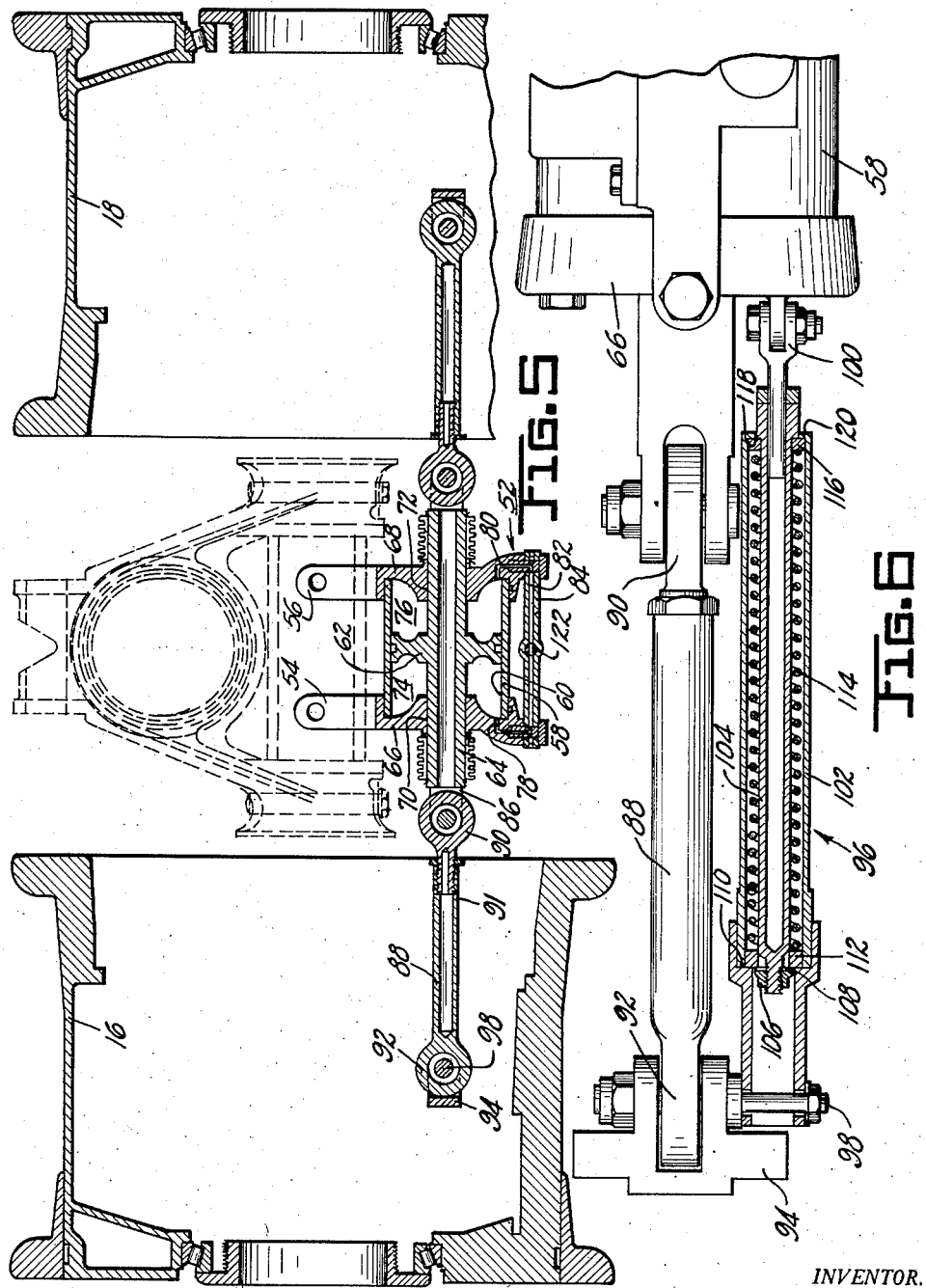

United States Patent Office 2,793,047
Patented May 21, 1957

2,793,047

STABILIZING AND CENTERING MEANS FOR DIRIGIBLE VEHICLE RUNNING GEAR

Franklin C. Albright, South Bend, Ind., assignor to Bendix Aviation Corporation, South Bend, Ind., a corporation of Delaware Application March 15, 1951, Serial No. 215,697

5 Claims. (Cl. 280—29)

The present invention relates to undercarriage for aircraft and more particularly to an undercarriage having swivelling or dirigible wheels.

It is an object of the present invention to provide an undercarriage for an aircraft which will facilitate cross-wind landings and take-offs. In achieving this object, the wheels of the undercarriage are swivelled permitting the aircraft to travel on a runway in such a manner that the longitudinal axis of the aircraft may be at an angle to the runway, or direction of aircraft transport.

It is another object to provide a swivelling undercarriage having a swivel control which has a direct effect on the manner in which said undercarriage swivels. This swivel control may be utilized to reduce the tendency of the swivelling undercarriage to shimmy and/or to determine the line of transport of the undercarriage.

It is still another object to provide a dual wheel castering gear having a control device which may be used to either steer the gear or to dampen its tendency to shimmy.

Other objects will become apparent as the description proceeds.

In the drawings:

Figure 1 is a rear elevation of an embodiment of the present invention;

Figure 2 is a side elevation of Figure 1;

Figure 4 is an inboard side elevation of the wheel of Figure 3 showing the axle therefor in cross-section;

Figure 5 is an axial section of the hydraulic control device of this invention, showing the wheels connected thereto in section; and Figure 6 is a partial view of the control device and of the wheel centering device but rotated 90° with respect to the showing of Figure 5.

Figure 3:
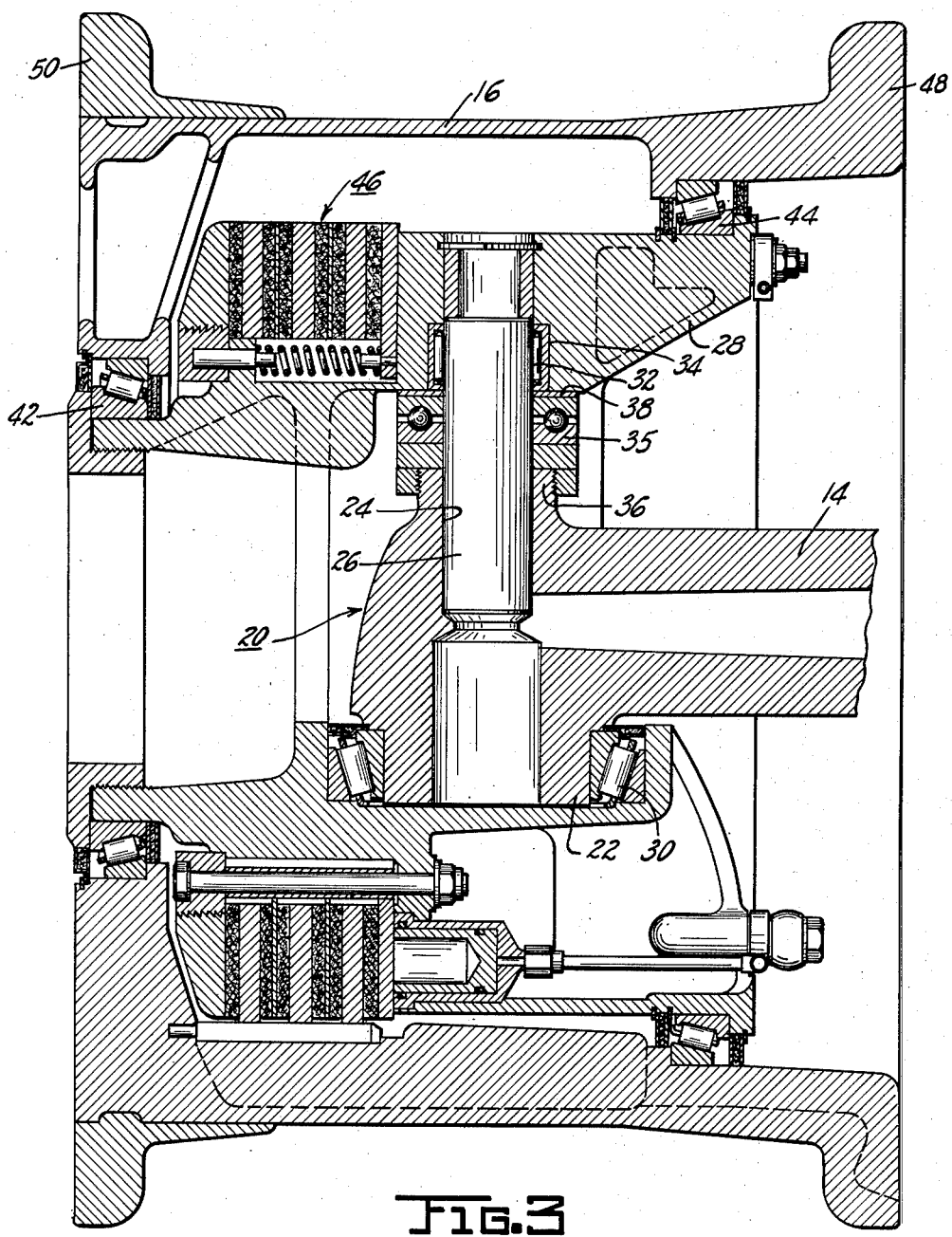
Figure 3 is an axial section of one of the wheels of Figure 1.

Referring more particularly to the drawings an aircraft landing gear strut 10 is forked at its upper end 12 for attachment to the body of an aircraft and carries at its low extremity a transversely extending axle 14 which supports on its outer ends two wheels 16 and 18. These wheels are identically mounted for castering action, and inasmuch as both wheels and their castering supports are identical, a description of one will suffice for both.

A kingpin assembly 20, hereinafter referred to as a kingpin, comprises essentially two parts, a transversely arranged stub 22 preferably formed integral with the outer end of the axle 14 and having a socket 24, and a pin 26 which is dropped into said socket 24. It is to be noted that the axis of the pin and that of the cylindrical stub 22 are coincident, the combination of the pin 26 and the stub 22, as explained above, forming the kingpin 20. A wheel hub 28, having an irregularly shaped opening 29, is swivelled on this kingpin 20 by means of the tapered bearing assembly 30 which surrounds the lower extremity of the stub 22, and a roller bearing 32 which surrounds the upper end of the pin 26 and fits in a companion socket 34 formed in the upper portion of the hub 28. In order to relieve the upward thrust load on the bearing 30, a thrust bearing 35 may be received on the upper end of pin 26 between the upper projection 36 of stub 22 and an adjacent bearing face 38 formed on the inner periphery of the swivelling or castering hub 28. A wheel 16 or 18 is rotatably mounted on hub 28 by means of the axially spaced bearings 42 and 44. A brake assembly, generally indicated by the reference numeral 46, may be interposed between the wheel 16 or 18 and the hub 28.

It is to be noted at this point that the axis of the kingpin 20 is on a diameter or center line of the wheel 16 equidistant or midway between the wheel sides 48 and 50. Also, as viewed in Figure 2, this axis is inclined as shown to an angle of approximately seventeen (17) degrees with the vertical to provide the castering action for the wheel as it is transported in the direction indicated by the arrow F. With the kingpin axis so inclined and located midway between the wheel sides, the forces tending to swivel or pivot the wheel about the kingpin are balanced thereby providing a true trailing or castering wheel.

Referring now to Figures 5 and 6, a hydraulic control device, generally indicated by reference numeral 52, is bolted to the middle section of the axle 14 by means of the two laterally spaced yokes 54 and 56. This hydraulic device 52 is comprised of a cylinder 58 having a bore 60 which receives for reciprocation a piston 62. A hollow connecting rod 64 is centrally secured to piston 62 to project from both ends thereof, the axes of cylinder 58 and connecting rod 64 being coincident and disposed parallel to the axis of axle 14 for a purpose which will become apparent hereafter. A pair of cylinder end plates 66 and 68 having central openings 70 and 72, respectively, which reciprocably receive therethrough in fluid tight relation the respective ends of rod 64, complete the enclosure of cylinder 58 whereby the piston 62 divides the bore into two variable volume fluid-containing chambers 74 and 76. These chambers 74 and 76 are interconnected by means of the passages 78 and 80 formed in the end walls 66 and 68, and a longitudinally extending passage 82 which connects the two passages 78 and 80 together. While this passage 82 is shown as being formed in a member 84 separate from the cylinder 58, it is to be understood that it may be formed in the wall of cylinder 58 without departing from the scope of this invention.

Since the structures on both sides of the diametric centerline of the device 52 are the same, a description of one structure (that on the left) will suffice for both. A clevis 86 is formed on the end of the connecting rod 64 and has pivotally connected thereto a coupling 88 which may be adjusted in length by means of the threaded connection between the two coupling parts 90 and 91. The opposite end of the coupling 88 is provided with an eyelet 92 which is pivotally fastened to clevis 94 suitably secured to the hub 28. As viewed in Figures 4 and 5, the connecting point between coupling 88 and clevis 94 is on a wheel radius midway between the wheel sides 48 and 50 and perpendicular to the axis of kingpin 20.

It is thus seen that by pivoting the wheels 16 and 18 about the respective kingpins 20, the piston 62 will be accordingly moved in the cylinder bore 60. The connecting rod 64 and associated couplings 88 serve to tie the two wheels 16 and 18 together so that their swivelling or castering action will be simultaneous and in parallelism. It is to be noted that the lengths of the two couplings 88 are adjusted to align the two wheels 16 and 18 in the same direction of transport.

If the wheels 16 and 18 are utilized as free castering wheels, it is necessary to provide a device for centering the wheels about their kingpins once the aircraft has risen from the ground to facilitate retraction of the wheels into the aircraft body. This centering device, generally indicated by the reference numeral 96, is characterized as a strut having one end connected to an extension of the pin 98 of clevis 94 and the other end 100 pivotally fastened to the end plate 66 of cylinder 52. This strut 96 is comprised of two telescoped tubular members 102 and 104. The inner tubular member 104 has a nut 106 and washer 108 received on the left-hand, or inner end thereof. An annular shoulder 110 is formed in the inner peripheral surface of the outer tubular member 102 and normally lies in the same plane as the right hand face of the washer 108. An annular spring backing or abutment 112 surrounds tubular member 104 and as illustrated engages both the washer 108 and the shoulder 110. A helical spring 114 is telescoped over the inner tubular member 104 to bear at one end against the abutment 112 and at the other end against another annular abutment 116 which surrounds inner tubular member 104 and normally engages an annular shoulder 118 formed on the outer surface of tubular member 104 and an inwardly turned flange 120 formed on the right-hand end of outer tubular member 102.

Thus it is seen, that if a force is applied to a wheel causing it to pivot in a counterclockwise direction around its kingpin 20, the strut 96 will be shortened in length, with the shoulder 110 picking up the abutment 112 and moving it to the right against the force of spring 114. When the pivot force applied to the wheel is removed, the spring 114 acts on the abutment 112 and shoulder 110 forcing the outer tubular member 102 to the left until the abutment 112 comes into abutting engagement with the washer 108. By applying a pivotal force on the wheel which rotates it in a clockwise direction about its kingpin 20, the strut 96 will be lengthened, the outer tubular member 102 moving to the left picking up by means of the flange 120 the abutment 116 which compresses the spring 114. When this clockwise pivotal force is removed from the wheel, the spring 114 acts against the abutment 116 and flange 120 to force the outer tubular member 102 to the right until the abutment 116 engages the shoulder 118 of the inner tubular member 104.

While the operation of the above described construction is believed to be obvious from the foregoing description, a brief summary thereof is believed to be in order. When the wheels 16 and 18 are free castering, they normally have a tendency, when being transported along on the ground, to shimmy. The hydraulic control device 52 is utilized to dampen this shimmy to a degree where it is no longer noticeable or objectionable. The chambers 74 and 76 are preferably filled with a liquid so that should the piston 62, for example, be forced to the right, it will act against the incompressible liquid in chamber 76 which must pass through the passage 80, passageway 82, passage 78 and finally into chamber 74. The passages are so sized that any rapid movement of piston 62 is strongly resisted and the tendency of wheels 16 and 18 to shimmy is dampened. However, these passages are made large enough so as not to interfere with the steerability of the wheels about their respective kingpins 20.

This same hydraulic control device 52 may be utilized as a steering control for the wheels 16 and 18. For example, by inserting a controllable shut-off valve 122 in the passageway 82 (see Figure 5) the communication between the two chambers 74 and 76 may be severed. Then, by connecting a manually controlled pump device to the outer ends of the passage 82, liquid under pressure may be selectively injected into either chamber 74 or 76. For example, by injecting liquid pressure into chamber 74, the piston 62 will be forced toward the right carrying with it the connecting rod 64 and the two couplings 88. The wheels 16 and 18 will be pivoted counterclockwise about their kingpins 20 thereby effecting a left-hand turn.

The present invention is particularly suited for use with the dual wheel arrangement herein disclosed which is commonly used on heavier type aircraft inasmuch as it is a single device for controlling two wheel members, is simple in construction, and reliable in operation. However, the same concept as disclosed herein may be utilized in connection with lighter type aircraft utilizing only one wheel. For example, a one wheel construction would be achieved by merely eliminating the wheel 18 and its associated axle and steering linkage.

Although only one embodiment of the invention has been illustrated and described, various changes in the form and relative arrangements of the parts may be made to suit requirements.

I claim:

1. A vehicle undercarriage comprising a stationary axle carrying on each end thereof a kingpin, a wheel supported on each kingpin for swivelling movement thereabout and for rotation about said axle, each wheel kingpin being disposed in the central portion of the respective wheel, a hydraulic cylinder secured to said axle between said wheels and reciprocably receiving a piston which defines two variable volume fluid-containing chambers, and a linkage connecting said piston to both wheels to maintain said wheels in parallelism and to translate swivelling movement of the wheels into reciprocatory movement of the piston, the points of connection of said linkage with said wheels being substantially midway between the respective wheel sides.

2. A vehicle undercarriage comprising a stationary axle carrying on each end thereof a kingpin, a wheel hub supported on each kingpin for swivelling movement thereabout and held against rotation about said axle, a wheel rotatably carried on each hub in such a manner that the axis of the respective kingpin is midway between the wheel sides, a hydraulic cylinder secured to said axle between said wheels and reciprocably receiving a piston which defines two variable volume fluid-containing chambers, and a jointed linkage pivotally connecting said piston to both hubs at points on the hub which are substantially midway between the respective wheel sides to maintain said wheels in parallelism and to translate the swivelling movement of the hubs into reciprocatory movement of the piston.

3. A vehicle undercarriage comprising a stationary axle adapted to be rigidly secured between its ends to a part of a vehicle, said axle having a kingpin provided on each end thereof, the axes of said kingpins being arranged parallel, each kingpin having a castering hub which is held against rotation about said axle, a wheel rotatably supported on each hub in such a manner that the kingpin lies midway between the sides of the wheel, a hydraulic cylinder rigidly fastened to said axle between said wheels, the axis of said cylinder being parallel to the axis of said axle and radially offset from the latter in a direction substantially perpendicular to the axes of said kingpins, a piston reciprocably received in said cylinder and defining two variable volume fluid-containing chambers, and a connecting linkage secured to said piston and oppositely projecting from the ends thereof, the outer extremities of said linkage being connected to the respective hubs at points substantially midway between the respective wheel sides and on lines substantially perpendicular to the kingpin axes, said linkage serving to maintain said wheels in parallelism and to transmit the castering motion of the wheels to said piston.

4. A vehicle undercarriage comprising a stationary axle adapted to be rigidly secured between its ends to a part of a vehicle, said axle having a kingpin provided on each end thereof, the axes of said kingpins being arranged parallel, each kingpin having a castering hub which is held against rotation about said axle, a wheel rotatably supported on each hub in such a manner that the kingpin lies midway between the sides of the wheel, a hydraulic cylinder rigidly fastened to said axle between said wheels, the axis of said cylinder being parallel to the axis of said axle and radially offset from the latter in a direction substantially perpendicular to the axes of said kingpins, a piston reciprocably received in seaid cylinder and defining two variable volume fluid-containing chambers, conduit means interconnecting said chambers whereby fluid will flow from one chamber to the other in response to movement of said piston in said cylinder, and a connecting linkage secured to said piston and oppositely projecting from the ends thereof, the outer extremities of said linkage being connected to the respective hubs at points substantially midway between the respective wheel sides and on lines substantially perpendicular to the kingpin axes, said linkage serving to maintain said wheels in parallelism and to transmit the castering motion of the wheels to said piston.

5. A vehicle undercarriage comprising a stationary axle adapted to be rigidly secured between its ends to a part of a vehicle, said axle having a kingpin provided on each end thereof, the axes of said kingpins being arranged parallel, each kingpin having a castering hub which is held against rotation about said axle, a wheel rotatably supported on each hub in such a manner that the kingpin lies midway between the sides of the wheel, a hydraulic cylinder rigidly fastened to said axle between said wheels, the axis of said cylinder being parallel to the axis of said axle and radially offset from the latter in a direction substantially perpendicular to the axes of said kingpins, a piston reciprocably received in said cylinder and defining two variable volume fluid-containing chambers, conduit means interconnecting said chambers whereby fluid will flow from one chamber to the other in response to movement of said piston in said cylinder, a connecting linkage secured to said piston and oppositely projecting from the ends thereof, the outer extremities of said linkage being connected to the respective hubs at points substantially midway between the respective wheel sides and on lines substantially perpendicular to the kingpin axes, said linkage serving to maintain said wheels in parallelism and to transmit the castering motion of the wheels to said piston, and a centering device for said wheels comprising a variable length strut connected at one end to one hub at a point on a line substantially perpendicular to the corresponding kingpin axis and at its other end to said cylinder, said strut having a spring which tends to maintain constant the length of said strut so that castering movement of said wheels will be yieldably opposed by said strut as said wheels are swivelled from a predetermined position.

References Cited in the file of this patent

UNITED STATES PATENTS

| | | |
|---|---|---|
| 925,536 | Umholtz | June 22, 1909 |
| 1,119,014 | Harris | Dec. 1, 1914 |
| 1,275,625 | Stedman | Aug. 13, 1918 |
| 1,951,483 | Knapp et al. | Mar. 20, 1934 |
| 2,047,059 | Clark | July 7, 1936 |
| 2,096,650 | Del Rio | Oct. 19, 1937 |
| 2,098,120 | Williams | Nov. 2, 1937 |
| 2,173,737 | Unlinski | Sept. 19, 1939 |
| 2,261,155 | Hedrick | Nov. 4, 1941 |
| 2,277,197 | Ash | Mar. 24, 1942 |
| 2,385,891 | Swanson | Oct. 2, 1945 |

FOREIGN PATENTS

| | | |
|---|---|---|
| 300,184 | Italy | Sept. 10, 1932 |